J. DAHLQUIST & L. LUCAS.
COVER FOR METALLIC RECEPTACLES.
APPLICATION FILED JUNE 8, 1911.
1,031,624.
Patented July 2, 1912.
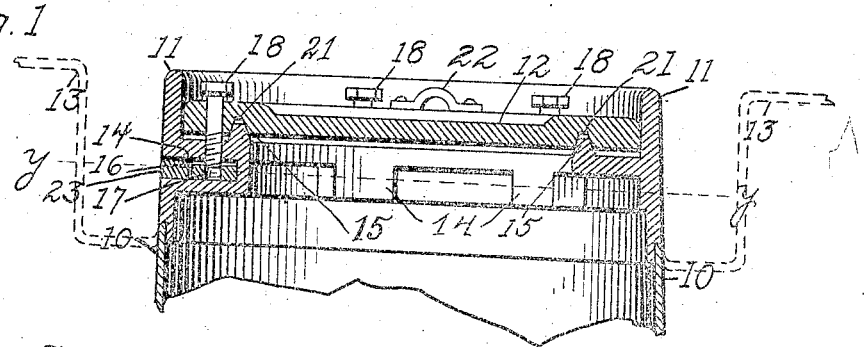
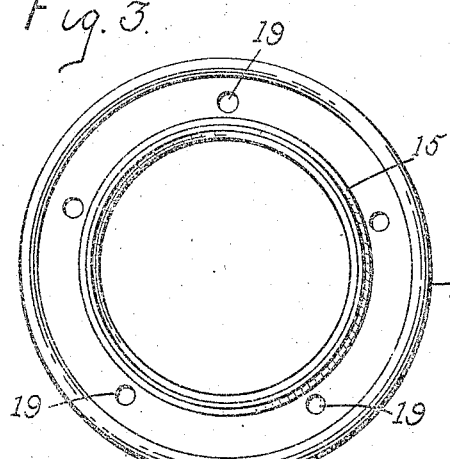
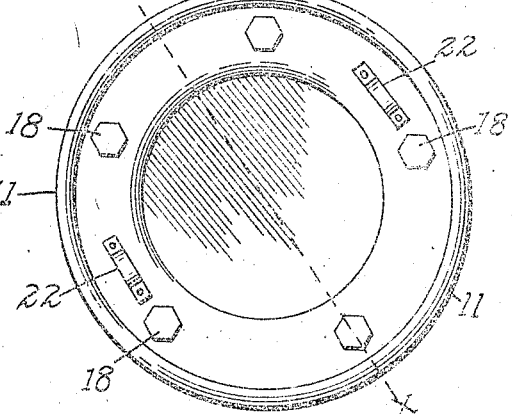
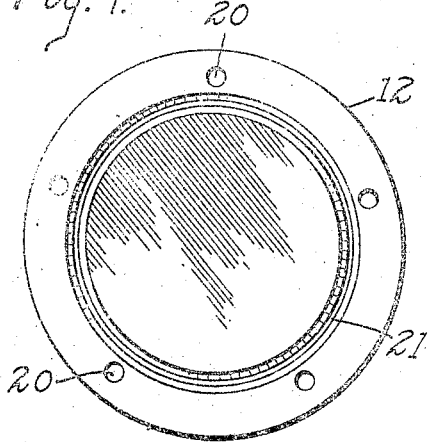
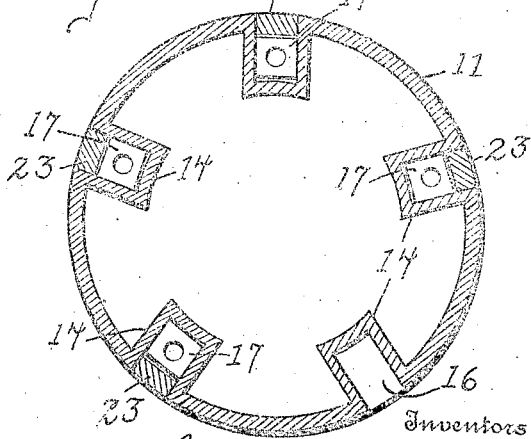

UNITED STATES PATENT OFFICE.

JOHN DAHLQUIST AND LOUIS LUCAS, OF JAMESTOWN, NEW YORK.

COVER FOR METALLIC RECEPTACLES.

1,031,624.

Specification of Letters Patent.

Patented July 2, 1912.

Application filed June 8, 1911. Serial No. 631,934.

*To all whom it may concern:*

Be it known that we, JOHN DAHLQUIST and LOUIS LUCAS, citizens of the United States, and residents of Jamestown, in the county of Chautauqua and State of New York, have invented new and useful Improvements in Covers for Metallic Receptacles, of which the following, taken in connection with the accompanying drawings, is a specification.

The invention relates to covers for the openings in metal receptacles, such as barrels, cans, tank cars, etc.; and the invention consists in providing a simple metallic closure which does not require packing to seal the joints sufficiently for carrying oils and similar liquids which require a sealed joint; and the invention consists in the construction and arrangement of the parts as described in this specification and shown in the accompanying drawings and pointed out in the claims.

In the drawings, Figure 1 is a sectional view of the closure or cover at line X X in Fig. 2. Fig. 2 is a top plan view of the cover and rim for holding the same. Fig. 3 is a plan view of the rim for holding the cover. Fig. 4 is a plan view of the under side of the cover. Fig. 5 is a sectional view of the barrel at line Y Y in Fig. 1.

Like numerals of reference refer to corresponding parts in the several views.

The numeral 10 indicates the receptacle; the numeral 11 the rim on the receptacle for holding the cover 12. The receptacle 10 may extend vertically from the rim 11, that is, the cover 12 and rim 11 may cover the entire end of the receptacle 10, or the cover 12 and rim 11 may extend over only a portion of the end of the receptacle and is preferably set into the same, as shown in dotted line 13 in Fig. 1.

The rim 11 is arranged with an inwardly extending flange 14 which has preferably a tongue 15 extending around the same. The rim 11 has also the holes or openings 16 therein just below the flange 14 and at spaced distances to receive the threaded nuts 17 for the attaching bolts 18. The holes or openings 16 are made to slidably fit the nuts 17 so that they cannot turn therein. The flange 14 has correspondingly spaced holes 19 extending therethrough into the openings 16; said holes 19 are outside of the tongue 15.

The cover 12 is provided with spaced holes 20 corresponding to the holes 19 to receive the screw bolts 18 for attaching the cover 12 to the rim 10. A groove 21 is provided around the under side of the cover 12 to fit the tongue 15. Both the tongue 15 and the groove 21 are ground so as to fit one another and form a liquid tight joint between the cover and rim. The bolts 18 extend through the cover and flange 14 over openings 16 and are turned into the threaded nuts 17, drawing the cover down firmly upon the tongue 15. This arrangement makes it possible to use common screw bolts and at the same time the bolts 18 obtain a strong leverage on the cover 12 in holding it upon the tongue 15.

The tongue 15 and groove 21 are so fitted to one another that tongue 15 does not reach to the bottom of groove 21 and the gradual opening of the preferably V-shaped ground sides of the groove 21 form such close contact with the correspondingly inclined ground surfaces of tongue 15 that a fluid tight joint or liquid seal is formed between these surfaces. A sufficient number of bolts 18 are used to firmly attach the cover 12 to the rim 11. For numerous reasons, however, the present arrangement is preferred.

The openings 16 are preferably made in projections just beneath the flange 14 so that said openings 16 are entirely closed from the interior of the receptacle. After the nuts 17 are inserted the mouths of the openings 16 are preferably closed either with wooden plugs 23 or wax or soft metal.

In order to remove the cover 12 it is often necessary to start said cover from the tongue 15 since the parts fit so tightly together as to adhere strongly. Accordingly handles 22 are provided on cover 12 which handles are so placed that a lever may be thrust under a handle 22 and will bear across the top of the rim 11 thereby obtaining a strong leverage which will easily start the cover and permit its removal.

Should the joint between the rim and cover, formed by the tongue 15 and the groove 21, become impaired in any way so that the liquid seeps through said joint, it may be quickly and cheaply repaired by dropping oil and emery into the groove 21, then placing the cover on the rim with the groove 21 on the tongue 15, said cover is then whirled back and forth with manual pressure by means of handles 22, thereby quickly grinding the metal surfaces of the groove and tongue to a perfect joint.

We claim as new:

1. In combination with a receptacle having a rim, an inwardly extending flange carried by the rim, said rim being formed with a series of openings that extend outwardly through the periphery of the rim, horizontally disposed nuts conformably received in said openings, said flange having openings that register with the threaded openings of the nuts, a cover seating on the flange and having openings that register with those of the flange and nuts, bolts passed through the cover and flange openings and engaging in said openings of the nuts to clamp the cover on said flange, and means to close the open outer ends of said rim openings.

2. In combination with a receptacle having an upwardly extending rim and an inwardly extending flange, an annular tongue at the inner circumference of said flange extending upwardly therefrom, said flange having upwardly converging sides and having its top face located below the top face of the rim, a cover having a groove which conformably receives said tongue, bolts passed through the cover and flange, and means carried by the flange to engage the bolts, said bolts being located between the rim and tongue.

In testimony whereof we have signed our names to this specification in the presence of two subscribing witnesses.

JOHN DAHLQUIST.
LOUIS LUCAS.

Witnesses:
A. W. NETTLE,
H. U. HARRIS.